(12) United States Patent
Nilsson et al.

(10) Patent No.: US 10,735,076 B2
(45) Date of Patent: Aug. 4, 2020

(54) SYSTEM AND METHOD FOR UPLINK PRECODING IN A COMMUNICATION SYSTEM

(71) Applicant: Telefonaktiebolaget LM Ericsson (publ), Stockholm (SE)

(72) Inventors: Andreas Nilsson, Göteborg (SE); Fredrik Athley, Kullavik (SE); Sven Petersson, Sävedalen (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 282 days.

(21) Appl. No.: 15/748,998

(22) PCT Filed: Sep. 27, 2017

(86) PCT No.: PCT/IB2017/055920
§ 371 (c)(1),
(2) Date: Jan. 30, 2018

(87) PCT Pub. No.: WO2018/060891
PCT Pub. Date: Apr. 5, 2018

(65) Prior Publication Data
US 2020/0091987 A1    Mar. 19, 2020

Related U.S. Application Data

(60) Provisional application No. 62/402,991, filed on Sep. 30, 2016.

(51) Int. Cl.
*H04B 7/02* (2018.01)
*H04B 7/06* (2006.01)

(52) U.S. Cl.
CPC ......... *H04B 7/0693* (2013.01); *H04B 7/0639* (2013.01)

(58) Field of Classification Search
CPC .................... H04B 7/0693; H04B 7/0639
USPC ........................................ 375/267
See application file for complete search history.

(56) References Cited

U.S. PATENT DOCUMENTS

| | | | |
|---|---|---|---|
| 2010/0075689 A1* | 3/2010 | Uemura | H04W 52/0206 455/452.1 |
| 2013/0022140 A1* | 1/2013 | Park | H04B 7/0617 375/260 |
| 2013/0128833 A1* | 5/2013 | Lee | H04W 52/146 370/329 |
| 2013/0315329 A1* | 11/2013 | Zhou | H04B 7/0486 375/267 |
| 2013/0336270 A1* | 12/2013 | Nagata | H04W 16/28 370/329 |

* cited by examiner

*Primary Examiner* — Don N Vo
(74) *Attorney, Agent, or Firm* — Boisbrun Hofman, PLLC

(57) ABSTRACT

System and method for uplink precoding in a communication system. In one embodiment, an apparatus is operable in a communication system and includes processing circuitry configured to identify an antenna element of a user equipment to disregard for uplink precoding, and provide an instruction to direct the user equipment to remove an antenna port associated with the antenna element from a codebook employed by the user equipment to precode a communication within the communication system.

12 Claims, 12 Drawing Sheets

SYSTEM AND METHOD FOR UPLINK PRECODING IN A COMMUNICATION SYSTEM

CROSS-REFERENCE TO RELATED APPLICATION

This application is the National Stage of, and therefore claims the benefit of, International Application No. PCT/IB2017/055920 filed on Sep. 27, 2017, entitled "SYSTEM AND METHOD FOR UPLINK PRECODING IN A COMMUNICATION SYSTEM" which claims the benefit of Provisional Application No. 62/402,991 entitled "SYSTEM AND METHOD FOR DYNAMICALLY PUNCTURING AN ANTENNA ELEMENT," filed Sep. 30, 2016. The above applications are commonly assigned with this National Stage application and are incorporated herein by reference in their entirety.

TECHNICAL FIELD

The disclosure relates to, in general, to one or more aspects of employing a plurality of antenna elements in a communication system such as a cellular communication system.

INTRODUCTION

For the next generation of mobile communications systems (5G), frequency bands at many different carrier frequencies may be employed to meet demand. For example, lower bands may be employed to achieve sufficient coverage and higher bands (e.g., millimeter wave ("mmW") near and above 30 gigahertz ("GHz")) may be employed to reach the necessary capacity. At higher frequencies, the propagation properties are more challenging and beamforming both at the base station and at a user equipment ("UE") may be utilized to reach sufficient link budget.

During operations such as precoding, the nodes or devices of the communication system such as a base stations and a user equipment often draw high power, which may unnecessarily increase power consumption and interference levels therein. Thus, it would be advantageous to introduce a system and method that reduces the power level and interference levels within the communications system.

Accordingly, what is needed in the art is a system and method for managing communication between a base station and a user equipment that considers path gains, interference levels, and battery lifetime issues such as remaining charge of a battery when controlling communication resources.

SUMMARY

These and other problems may be generally solved or circumvented, and technical advantages may be generally achieved, by advantageous embodiments for system and method for uplink precoding in a communication system. In one embodiment, an apparatus is operable in a communication system and includes processing circuitry configured to identify an antenna element of a user equipment to disregard for uplink precoding, and provide an instruction to direct the user equipment to remove an antenna port associated with the antenna element from a codebook employed by the user equipment to precode a communication within the communication system.

The foregoing has outlined rather broadly the features and technical advantages of the present examples in order that the detailed description that follows may be better understood. Additional features and advantages of various examples will be described hereinafter, which form the subject of the claims of the invention. It should be appreciated by those skilled in the art that the conception and specific embodiments disclosed may be readily utilized as a basis for modifying or designing other structures or processes for carrying out the same purposes of different embodiments. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present invention, reference is now made to the following descriptions taken in conjunction with the accompanying drawings, in which.

Corresponding numerals and symbols in the different figures generally refer to corresponding parts unless otherwise indicated, and may not be redescribed in the interest of brevity after the first instance. The FIGUREs are drawn to illustrate the relevant aspects of exemplary embodiments.

DETAILED DESCRIPTION

The making and using of the present exemplary embodiments are discussed in detail below. It should be appreciated, however, that the embodiments provide many applicable inventive concepts that can be embodied in a wide variety of specific contexts. The specific embodiments discussed are merely illustrative of specific ways to make and use the systems, subsystems, and modules to puncture (or remove) an antenna port/element of a multi-antenna communication device in a communication system. While the principles will be described in the environment of a 3GPP Long Term Evolution ("LTE") or New Radio ("NR") communication system, any environment such as a Wi-Fi wireless communication system is well within the broad scope of the present disclosure.

Figure 1:
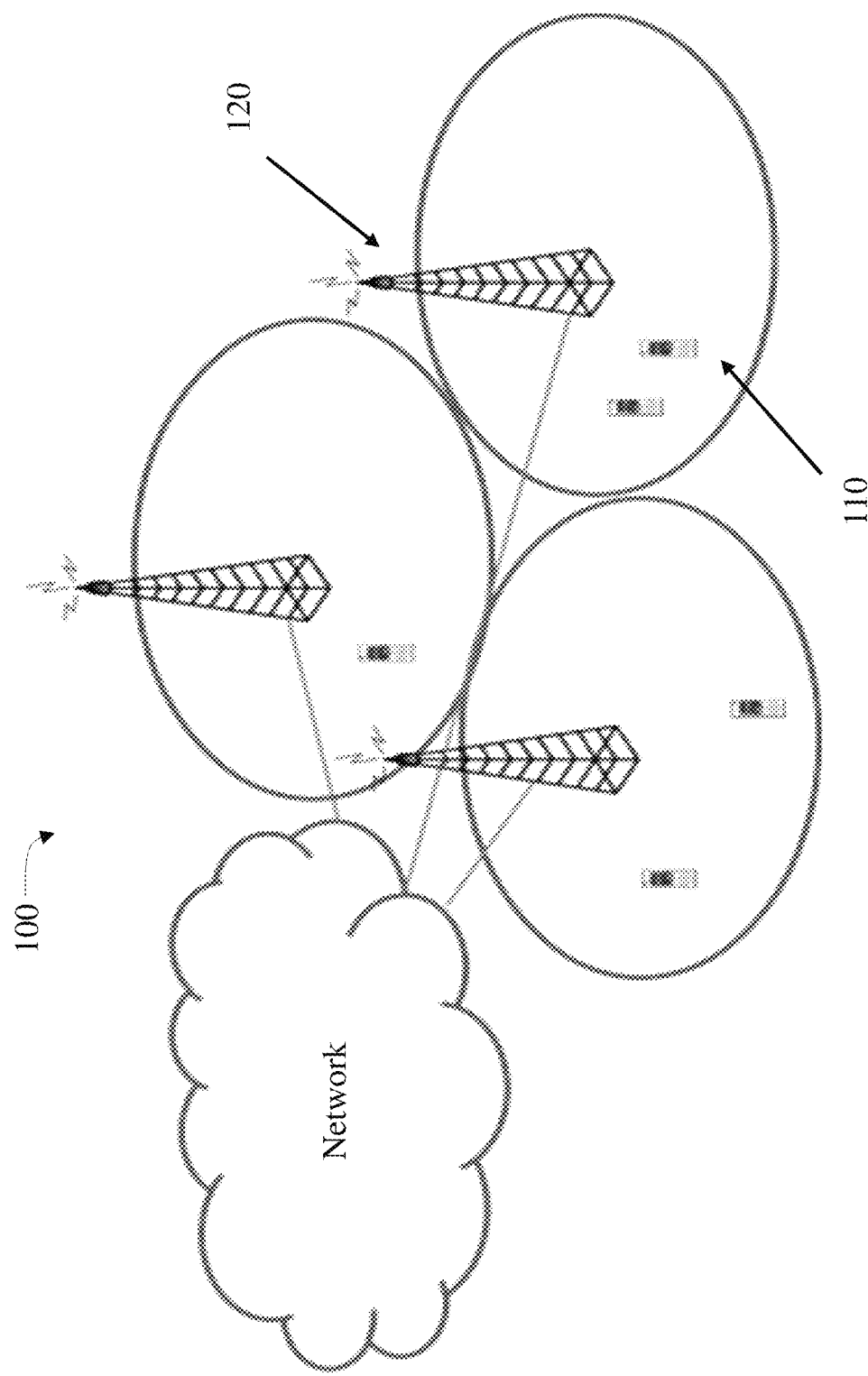
FIGS. 1 to 3 illustrate diagrams of embodiments of a communication system, and portions thereof.
Figure 2:
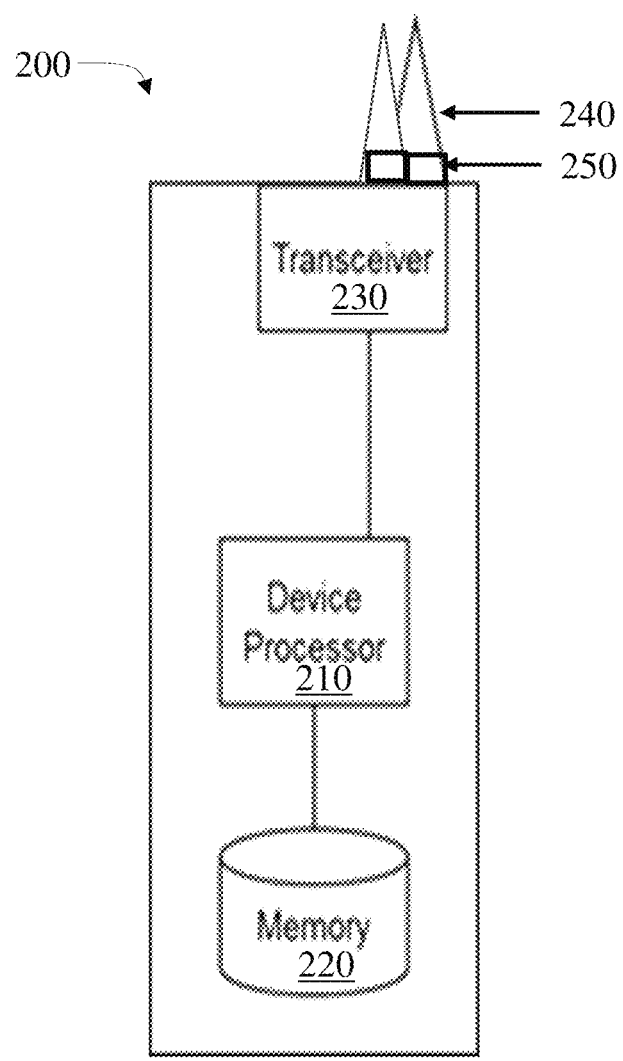
Figure 3:
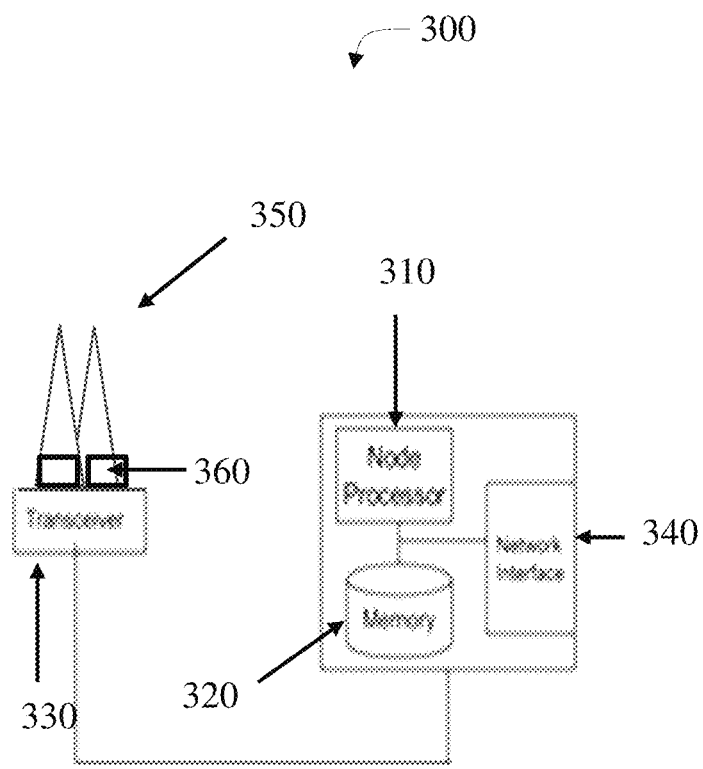

Referring initially to FIGS. 1 to 3, illustrated are diagrams of embodiments of a communication system 100, and portions thereof. As shown in FIG. 1, the communication system 100 includes one or more instances of wireless communication devices (one of which is designated 110, and also referred to as user equipment ("UE")). The wireless communication device 110 may be any device that has an addressable interface (e.g., an Internet protocol ("IP") address, a Bluetooth identifier ("ID"), a near-field communication ("NFC") ID, etc.) and/or is intended for accessing services via an access network and configured to communicate over the access network via the addressable interface. For instance, the wireless communication device 110 may be, but is not limited to: mobile phone, smart phone, sensor device, meter, vehicle, household appliance, medical appliance, media player, camera, or any type of consumer electronic, for instance, but not limited to, television, radio, lighting arrangement, tablet computer, laptop, or PC. The wireless communication device 110 may be a portable, pocket-storable, hand-held, computer-comprised, or vehicle-mounted mobile device, enabled to communicate voice and/or data, via a wireless or wireline connection. A wireless communication device 110 may have functionality for performing monitoring, controlling, measuring, recording, etc., that can be embedded in and/or controlled/monitored by a central processing unit ("CPU"), microprocessor, ASIC, or the like, and configured for connection to a network such as a local ad-hoc network or the Internet. A wireless communication device 110 may have a passive communication interface, such as a quick response (Q) code, a radio-frequency identification ("RFID") tag, an NFC tag, or the like, or an active communication interface, such as a modem, a transceiver, a transmitter-receiver, or the like.

The communication system 100 also includes one or more radio access nodes (one of which is designated 120) such as eNodeBs, gNodeBs, or other base stations capable of communicating with the wireless communication devices 110 along with any additional elements suitable to support communication between wireless communication devices 110 or between a wireless communication device 110 and another communication device (such as a landline telephone). Although the illustrated wireless communication devices 110 may represent communication devices that include any suitable combination of hardware and/or software, the wireless communication devices 110 may, in particular embodiments, represent devices such as the example wireless communication device illustrated in greater detail by FIG. 2. Similarly, although the illustrated radio access node 120 may represent network nodes that include any suitable combination of hardware and/or software, these nodes may, in particular embodiments, represent devices such as the example radio access node illustrated in greater detail by FIG. 3.

As shown in FIG. 2, the example wireless communication device 200 includes a processor (or processing circuitry) 210, a memory 220, a transceiver 230, and antennas (or antenna elements) 240 with respective antenna ports 250. In particular embodiments, some or all of the functionality described above as being provided by machine type communication ("MTC") and machine-to-machine ("M2M") devices, and/or any other types of wireless communication devices may be provided by the device processor executing instructions stored on a computer-readable medium, such as the memory shown in FIG. 2. Alternative embodiments of the wireless communication device 200 may include additional components beyond those shown in FIG. 2 that may be responsible for providing certain aspects of the device's functionality, including any of the functionality described above and/or any functionality necessary to support the solution described herein.

As shown in FIG. 3, the example radio access node 300 includes a processor (or processing circuitry) 310, a memory 320, a transceiver 330, a network interface 340 and antennas 350 (or antenna elements) with respective antenna ports 250. In particular embodiments, some or all of the functionality described herein may be provided by a base station, a node B, an enhanced node B, a base station controller, a radio network controller, a relay station and/or any other type of network node may be provided by the node processor executing instructions stored on a computer-readable medium, such as the memory shown in FIG. 3. Alternative embodiments of the radio access node 300 may include additional components responsible for providing additional functionality, including any of the functionality identified above and/or any functionality necessary to support the solution described herein.

The processors, which may be implemented with one or a plurality of processing devices, performs functions associated with its operation including, without limitation, precoding of antenna gain/phase parameters, encoding and decoding of individual bits forming a communication message, formatting of information and overall control of a respective communication device. Exemplary functions related to management of communication resources include, without limitation, hardware installation, traffic management, performance data analysis, configuration management, security, billing and the like. The processors may be of any type suitable to the local application environment, and may include one or more of general-purpose computers, special purpose computers, microprocessors, digital signal processors ("DSPs"), field-programmable gate arrays ("FPGAs"), application-specific integrated circuits ("ASICs"), and processors based on a multi-core processor architecture, as non-limiting examples.

The memories may be one or more memories and of any type suitable to the local application environment, and may be implemented using any suitable volatile or nonvolatile data storage technology such as a semiconductor-based memory device, a magnetic memory device and system, an optical memory device and system, fixed memory and removable memory. The programs stored in the memories may include program instructions or computer program code that, when executed by an associated processor, enable the respective communication device to perform its intended tasks. Of course, the memories may form a data buffer for data transmitted to and from the same. Exemplary embodiments of the system, subsystems, and modules as described herein may be implemented, at least in part, by computer software executable by processors, or by hardware, or by combinations thereof The transceivers modulate information onto a carrier waveform for transmission by the respective communication device via the respective antenna(s) to another communication device. The respective transceiver demodulates information received via the antenna(s) for further processing by other communication devices. The transceiver is capable of supporting duplex operation for the respective communication device. The network interface performs similar functions as the transceiver communicating with a core network.

As introduced herein, the use of antenna ports in a codebook is dynamically punctured (also referred to as restricted or removed, e.g., temporarily setting an antenna element transmit power level to zero). Thus, the antenna port is not typically permanently removed from the codebook, but is not available for precoding until specified otherwise, or for a specified period of time, etc. The dynamic restriction can be done either by the base station or the user equipment. The dynamic restriction can serve several purposes such as reducing interference, reducing power consumption, reducing radio frequency ("RF") exposure, and reducing signaling compared to a larger codebook that employs static puncturing (associated with a precoder matrix indicator ("PMI")).

An antenna at a base station or a user equipment is dynamically punctured (i.e., one or more antenna ports/elements in an existing codebook are temporarily not used). Which ports to dynamically puncture can be decided, or proposed, either by a user equipment or by the base station based on different inputs. For example, the base station can identify which antenna ports of the user equipment have (in a present condition) significantly lower path gain than other antenna ports and thus contribute only marginally to the received signal power at the base station. Another reason for not using an antenna port with lower path gain can be to reduce output power and by that also the associated power consumption, for example, when the battery level in the user equipment is getting low.

The user equipment may observe that one or more antenna ports have a strong link to some other base station than the serving base station and for purposes of reducing interference preferably will not use that/these antenna ports. Yet another example is that the user equipment can identify, by proximity sensor(s) or some other device that the use of an antenna, or a set of antennas, shall should not be used due to RF exposure.

Figure 4:
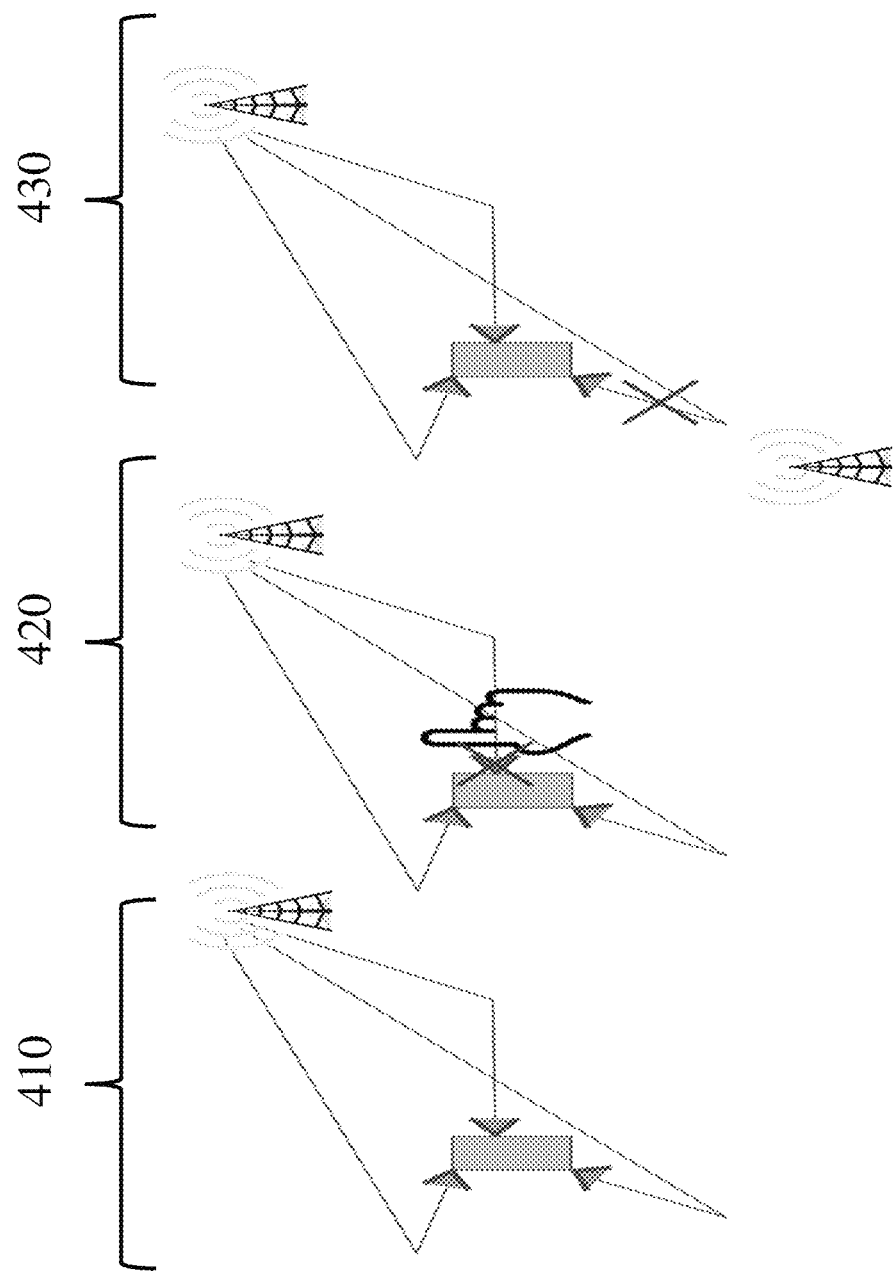
FIG. 4 illustrates system level diagrams of embodiments of communication systems under different operational conditions.

Turning now to FIG. 4, illustrated are system level diagrams of embodiments of communication systems under different operational conditions. The communication system designated 410 is operating under normal conditions and, as such, no antenna puncturing is necessary. The communication system designated 420 illustrates a case wherein an antenna (or antenna element) of a user equipment is blocked by a hand of a user and hence does not give any significant contribution to the received signal power at the base station. Therefore, this antenna can be punctured to save energy at the user equipment. The communication system designated 430 illustrates a case wherein one antenna (or antenna element) of the user equipment creates interference to a neighboring non-serving base station (or to another user equipment) and hence this antenna (or antenna element) is blocked for uplink ("UL") precoding to reduce interference to the neighboring base station (or to the another user equipment). The baseline is that the communication system decides which antenna(s) (or antenna ports associated with an antenna element) to puncture (or remove) based on information collected at the base station (or elsewhere) as well as information collected at the user equipment and reported to the base station.

Figure 5:
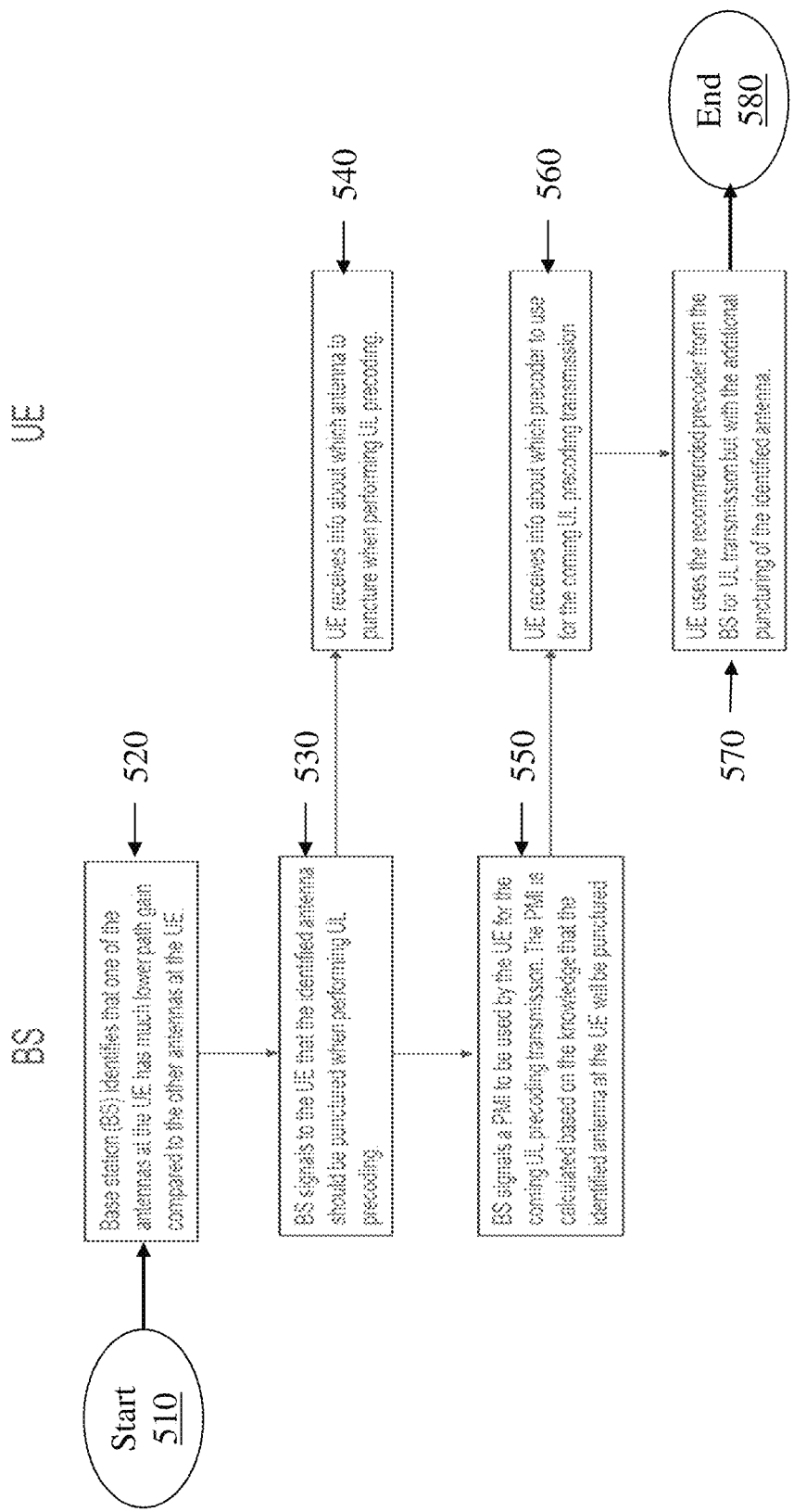
FIGS. 5 to 12 illustrate flow diagrams of embodiments of methods of operating a communication system.

Turning now to FIG. 5, illustrated is a flow diagram of an embodiment of a method of operating a communication system. In the illustrated embodiment, the base station (also designated ("BS")) identifies an antenna (or antenna element) of the user equipment ("UE") that does not contribute significantly to received power at the base station. The base station then signals to the user equipment that the identified antenna (or an antenna port associated therewith) should be punctured (or removed) in the coming uplink ("UL") precoding transmissions. In the next step, the base station calculates a precoder matrix indicator ("PMI") based on uplink sounding reference signals ("SRS") from the user equipment in accordance with closed-loop precoding. A difference here is that when the base station calculates the preferred PMI, it preferably takes the puncturing of the identified antenna into account. The base station then signals the PMI to the user equipment and the user equipment applies the PMI during the coming uplink precoding transmission, but with the identified antenna punctured. Since the puncturing will be taken into account, an SRS may be sent for antennas (antenna elements) that will not be used in precoding with a transmit power level set to zero.

As illustrated in FIG. 5, the method begins at a start step or module 510. At a step or module 520, a base station identifies that one of the antennas (or antenna elements) at the user equipment that has much lower path gain (or other adverse condition) compared to other antennas (or antenna elements) at the user equipment. At a step or module 530, the base station signals to the user equipment that the identified antenna should be punctured (or removed) when performing uplink precoding. At a step or module 540, the user equipment receives information from the base station about which antenna to puncture when performing the uplink precoding.

The base station also signals a PMI to be used by the user equipment for the coming uplink precoding transmission at a step or module 550. In an embodiment, the PMI is calculated by the base station based on knowledge that the identified antenna at the user equipment will be punctured. At a step or module 560, the user equipment receives information from the base station about which precoder to use for the coming uplink precoding transmission. The user equipment uses the recommended precoder from the base station for the uplink transmission, but with the additional puncturing of the identified antenna at a step or module 570. The method ends at an end step or module 580.

In an alternative embodiment, the user equipment identifies that one of the antennas (or antenna elements) thereof that create substantial interference to a neighboring non-serving base station. The user equipment therefore signals to the base station that it would like to puncture (or remove) this antenna (or antenna port) during coming uplink precoding transmissions. The base station receives the information, accepts the proposal from the user equipment, and signals an acknowledgement back to the user equipment. In the next step, the base station calculates a PMI based on uplink sounding reference signals from the user equipment while taking the puncturing of the identified antenna into account. The base station then signals the PMI to the user equipment and the user equipment applies the PMI during the coming uplink precoding transmission but with the identified antenna punctured.

Figure 6:
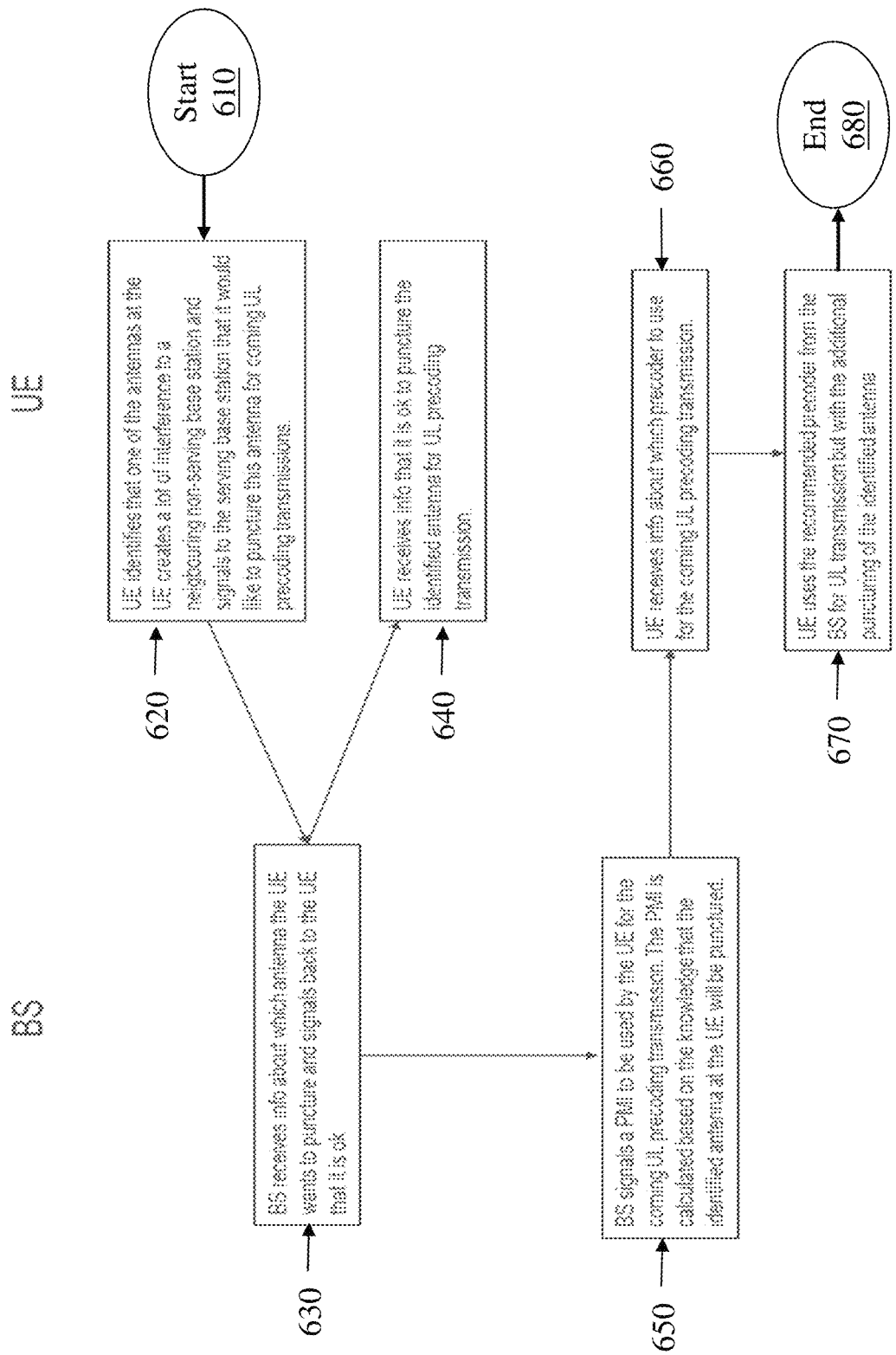

Turning now to FIG. 6, illustrated is a flow diagram of an embodiment of a method of operating a communication system. The method begins at a start step or module 610. At a step or module 620, a user equipment ("UE") identifies an antennas (or antenna elements) that create substantial interference to a neighboring non-serving base station. The user equipment signals to the serving base station ("BS") that it would like to puncture (or remove) this antenna (or antenna port associated therewith) for coming uplink precoding transmissions. At a step or module 630, the base station receives information about which antenna the user equipment wants to puncture, and signals back to the user equipment that such puncturing is acceptable. The user equipment receives the information that it is acceptable to puncture the identified antenna for uplink precoding transmission at a step or module 640.

At a step or module 650, the base station signals a PMI to be used by the user equipment for the coming uplink precoding transmission. The PMI may be calculated based on the knowledge that the identified antenna at the user equipment will be punctured. At a step or module 660, the user equipment receives the information about which precoder to use for the coming uplink precoding transmission. The user equipment uses the recommended precoder from the base station for the uplink transmission but with the additional puncturing of the identified antenna at a step or module 670. The method ends at an end step or module 680.

In another embodiment the user equipment can decide an antenna (again, or antenna element) to puncture (or remove) on its own accord. For instance, the user equipment may determine that one of its antennas has negligible contribution to the received power at the base station and that it would be beneficial from another perspective to puncture the antenna. Other beneficial perspectives include, without limitation, power consumption, generated interference, RF exposure, etc. The user equipment may perform the antenna puncturing without informing the base station without any significant deterioration of the performance for the uplink precoding transmissions. If the user equipment does not send any sounding reference signals on the punctured antenna, it will have the same effect as if the base station had estimated the PMI with respect to the puncture. The base station may inform the user equipment to make antenna port puncturing decisions on its own as long as the estimated impact does not exceed some threshold. One threshold may be that the average received power shall not be reduced by more than some signaled number such as 0.5 decibels.

Figure 7:
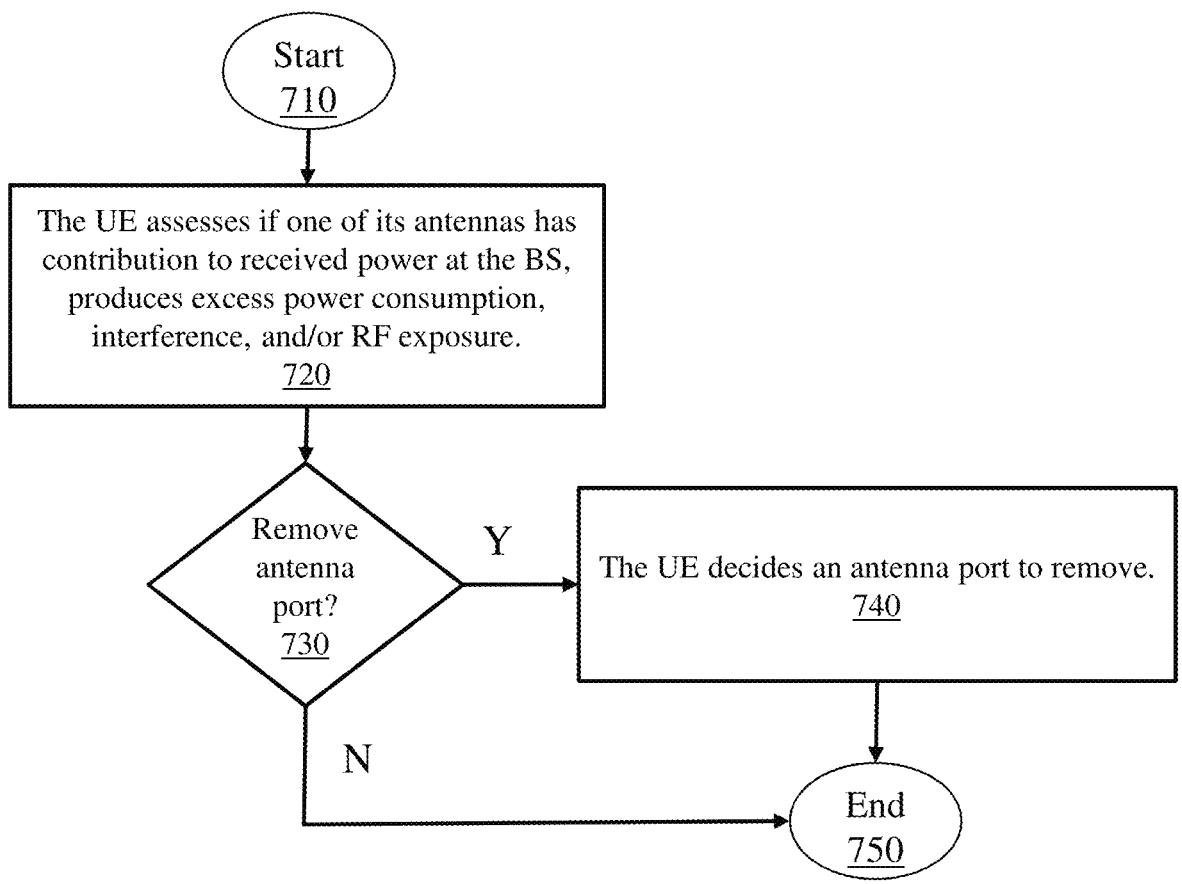

Turning now to FIG. 7, illustrated is a flow diagram of an embodiment of a method of operating a communication system. The method begins at a start step or module 710. At a step or module 720, the user equipment ("UE") assesses if one of its antennas (or antenna elements) makes negligible contribution to received power at the base station ("BS"), produces excess power consumption, interference, and/or RF exposure. At a decisional step or module 730, if one or more of the criteria are met, then, at a step or module 740, the user equipment decides an antenna port to remove with or without informing the base station. Thereafter, the method ends at an end step or module 750. If one or more of the aforementioned criteria are not met, the method ends at the end step or module 750.

Thus, the user equipment punctures (or removes) antenna ports associated with the antenna elements when performing uplink precoding to improve some metric, for example, generated interference, power consumption, etc. In accordance therewith, the base station can signal a puncturing codebook or under certain conditions the user equipment can operate on its own accord.

In one embodiment, an LTE or NR codebook is reused as a starting point. For the case of multiple transmit antennas (or antenna elements), puncturing of codebooks (e.g., setting the output power to zero for one or more of the antenna elements) can be employed for several purposes. One example is reduced interference. Antenna port puncturing is employed in distinction with current LTE or NR codebook subset restrictions where some PMIs can be blanked. The dynamic puncturing (or removing) of elements or ports can be done for several reasons such as non-significant contribution to a received signal, to reduce interference, to reduce power consumption in a user equipment, to meet exposure limit requirements, etc.

In one embodiment, a communication node (e.g., a base station) is configured determine if an antenna element of a user equipment produces an adverse condition (e.g., excess power consumption, interference to another communication element, and/or radio frequency ("RF") exposure) for an uplink transmission by the user equipment, or receive an indication that the antenna element of the user equipment produces the adverse condition. The communication node is also configured to provide a signal to the user equipment to dynamically puncture (or remove) an identified antenna element (or respective port) causing the adverse condition. In accordance therewith, the communication node is configured to provide a precoder matrix indicator ("PMI"). The communication node may calculate the PMI based on uplink sounding reference signals from the user equipment while taking the puncturing of the identified antenna element into account.

In another embodiment, a communication device (e.g., a user equipment) is configured determine if an antenna element thereof produces an adverse condition (e.g., excess power consumption, interference to another communication element, and/or radio frequency ("RF") exposure) for an uplink transmission by the user equipment. The communication device is also configured to receive a signal from a base station to dynamically puncture (or remove) an identified antenna element (or respective port) causing the adverse condition. In accordance therewith, the communication device is configured to receive a precoder matrix indicator ("PMI").

In yet another embodiment, a communication device (e.g., a user equipment) is configured determine if an antenna element thereof produces an adverse condition (e.g., excess power consumption, interference to another communication element, and/or radio frequency ("RF") exposure) for an uplink transmission by the user equipment. The communication device is also configured to dynamically puncture (or remove) an identified antenna element (or respective port) causing the adverse condition. The communication device is enabled to make antenna port puncturing decisions as long as an estimated impact (or a communication parameter) does not exceed (or is less than) some threshold. One threshold may be that the average received power meets a criterion such as the average received power shall not be reduced by more than some signaled number such as 0.5 decibels ("dB"). In other words, the average received power is within a margin (such as 0.5 dB) of a threshold.

Figure 8:
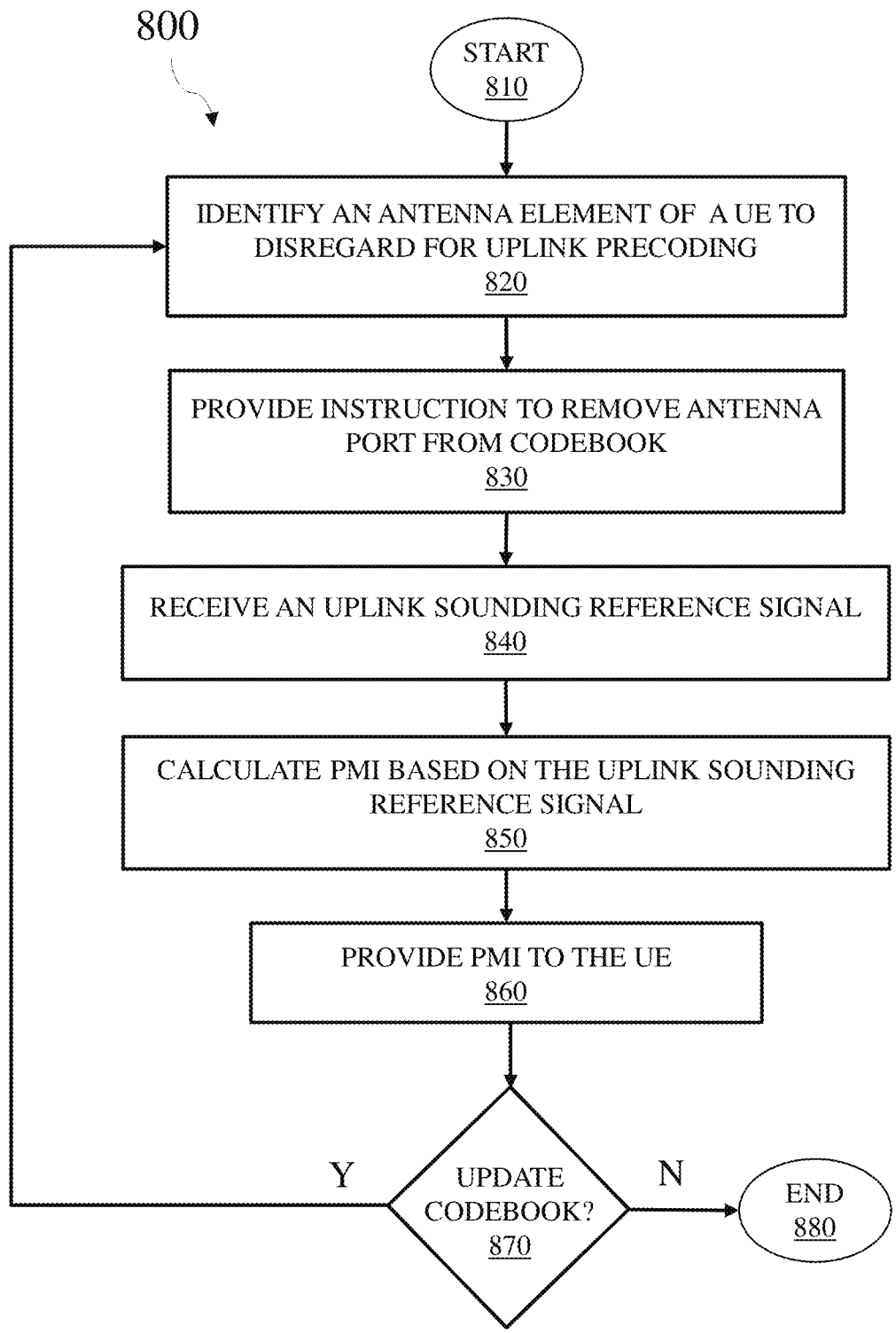

Turning now to FIG. 8, illustrated is a flow diagram of an embodiment of a method 800 of operating a communication system (100). In addition to the method steps, the discussion of the method 800 that follows will identify example elements (in parentheses) from preceding FIGUREs. The method 800 begins at a start step or module 810. At a step or module 820, an apparatus such as a radio access node (e.g., a base station 120, 300 including processing circuitry 310) identifies an antenna element (240) of a user equipment (110, 200) to disregard for uplink precoding. The antenna element (240) may provide, without limitation, interference for another node (110, 200) of the communication system (100), excess power consumption by the user equipment (110, 200), excess power consumption in relation to a battery charge level of the user equipment (110, 200), adverse radio-frequency exposure associated with a communication by the user equipment (110, 200), lower path gain compared to another antenna element (240) of the user equipment (110, 200), and/or insignificant contribution to received signal power at the apparatus (120, 300). For instance, the antenna element (240) may have a path gain 0.5 decibels lower than a path gain of another antenna element (240) at the user equipment (110, 200).

At a step or module 830, the apparatus (120, 300) provides an instruction to direct the user equipment (110, 200) to remove an antenna port (250, e.g., temporarily setting the antenna port transmit power level to zero) associated with the antenna element (240) from a codebook employed by the user equipment (110, 200) to precode a communication within the communication system (100). The apparatus (120, 300) receives an uplink sounding reference signal from the user equipment (110, 200) at a step or module 840. At a step or module 850, the apparatus (120, 300) calculates a precoder matrix indicator ("PMI") based on the uplink sounding reference signal and also taking into account removal of the antenna port (250) associated with the antenna element (240), and provides the PMI to the user equipment (110, 200) at a step or module 860. Of course, receipt of the uplink sounding reference signal and resulting PMI may occur as earlier steps in the method 800 of operating the communication system (100). At a decisional step or module 870, the apparatus (120, 300) determines if the codebook should be updated. If the codebook should be updated, the method 800 returns to the step or module 820 for further processing, otherwise the method 800 ends at an end step or module 880. Of course, if no other antenna port (250) should be removed from the codebook but other updates are necessary, then the method 800 may omit selective steps or modules of the method 800 of operating the communication system (100). Also, updating the codebook includes modifying the use of the codebook such as temporarily restricting the availability of an antenna port (250) thereof, but not necessarily permanently removing the specified antenna port (250) from the codebook.

Figure 9:
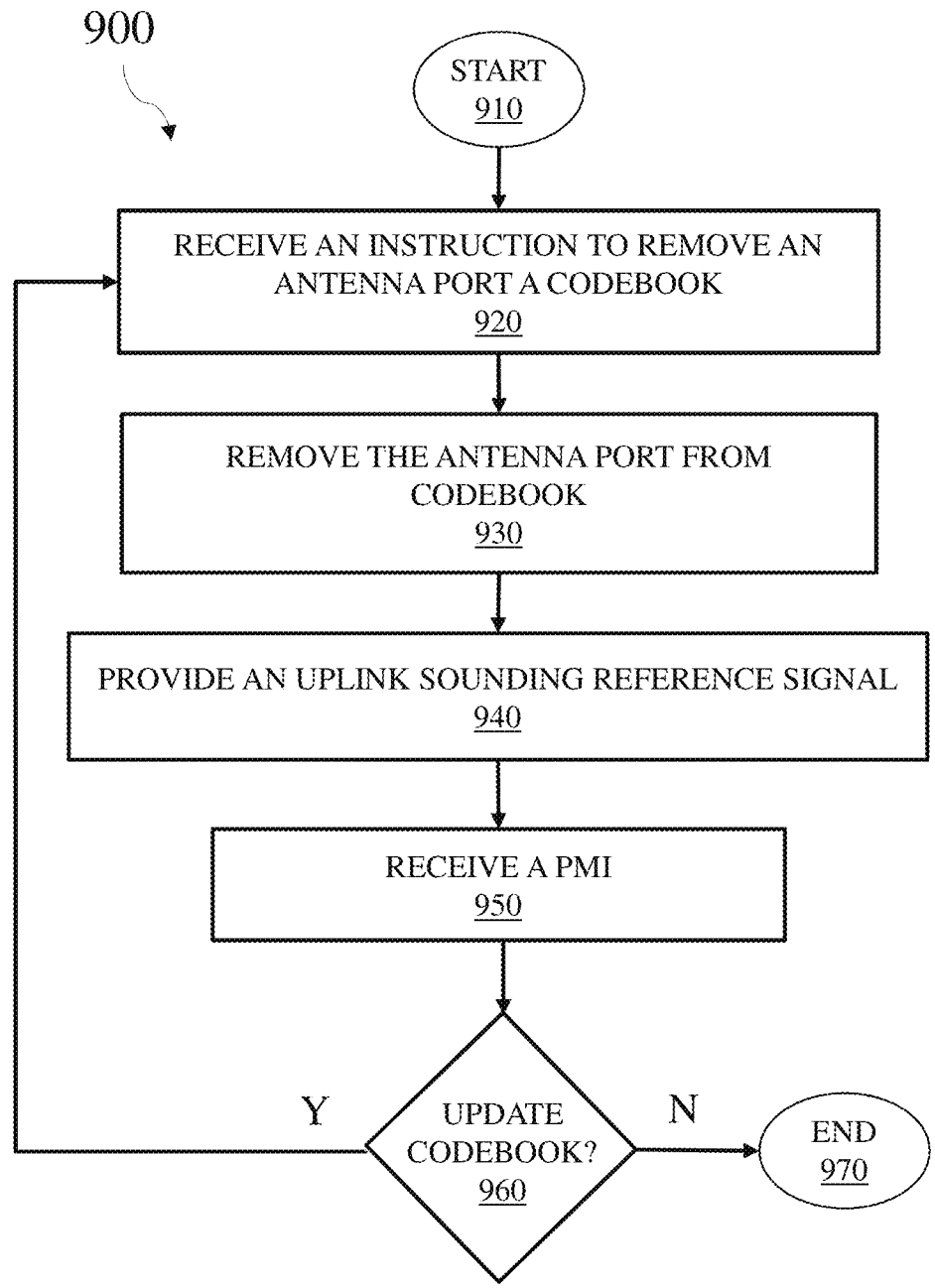

Turning now to FIG. 9, illustrated is a flow diagram of an embodiment of a method 900 of operating a communication system (100). In addition to the method steps, the discussion of the method 900 that follows will identify example elements (in parentheses) from preceding FIGUREs. The method 900 begins at a start step or module 910. At a step or module 920, an apparatus such as a user equipment (110, 200) including processing circuitry (210) receives an instruction to remove an antenna port (250) associated with an antenna element (240) of the apparatus (110, 200) to disregard for uplink precoding. The antenna element (240) may provide, without limitation, interference for another node (110, 200) of the communication system (100), excess power consumption by the apparatus (110, 200), excess power consumption in relation to a battery charge level of the apparatus (110, 200), adverse radio-frequency exposure associated with a communication by the apparatus (110, 200), lower path gain compared to another antenna element (240) of the apparatus (110, 200), and/or insignificant contribution to received signal power at a radio access node (120, 300). For instance, the antenna element (240) may have a path gain 0.5 decibels lower than a path gain of another antenna element (240) at the apparatus (110, 200).

At a step or module 930, the apparatus (110, 200) removes the antenna port (250, e.g., temporarily setting the antenna port transmit power level to zero) associated with the antenna element (240) from a codebook employed by the apparatus (110, 200) to precode a communication within the communication system (100). The apparatus (110, 200) provides an uplink sounding reference signal to a radio access node (120, 300) to calculate a precoder matrix indicator ("PMI") at a step or module 940. At a step or module 950, the apparatus (110, 200) receives the PMI from the radio access node (120, 300). Of course, providing the uplink sounding reference signal and resulting PMI may occur as earlier steps in the method 900 of operating the communication system (100). At a decisional step or module 960, the radio access node (120, 300, or another communication node in the communication system 100) determines if the codebook should be updated. If the codebook should be updated, the method 900 returns to the step or module 920 for further processing, otherwise the method 900 ends at an end step or module 890. Of course, if no other antenna port (250) should be removed from the codebook but other updates are necessary, then the method 900 may omit selective steps or modules of the method 900 of operating the communication system (100). Also, updating the codebook includes modifying the use of the codebook such as temporarily restricting the availability of an antenna port (250) thereof, but not necessarily permanently removing the specified antenna port (250) from the codebook.

Figure 10:
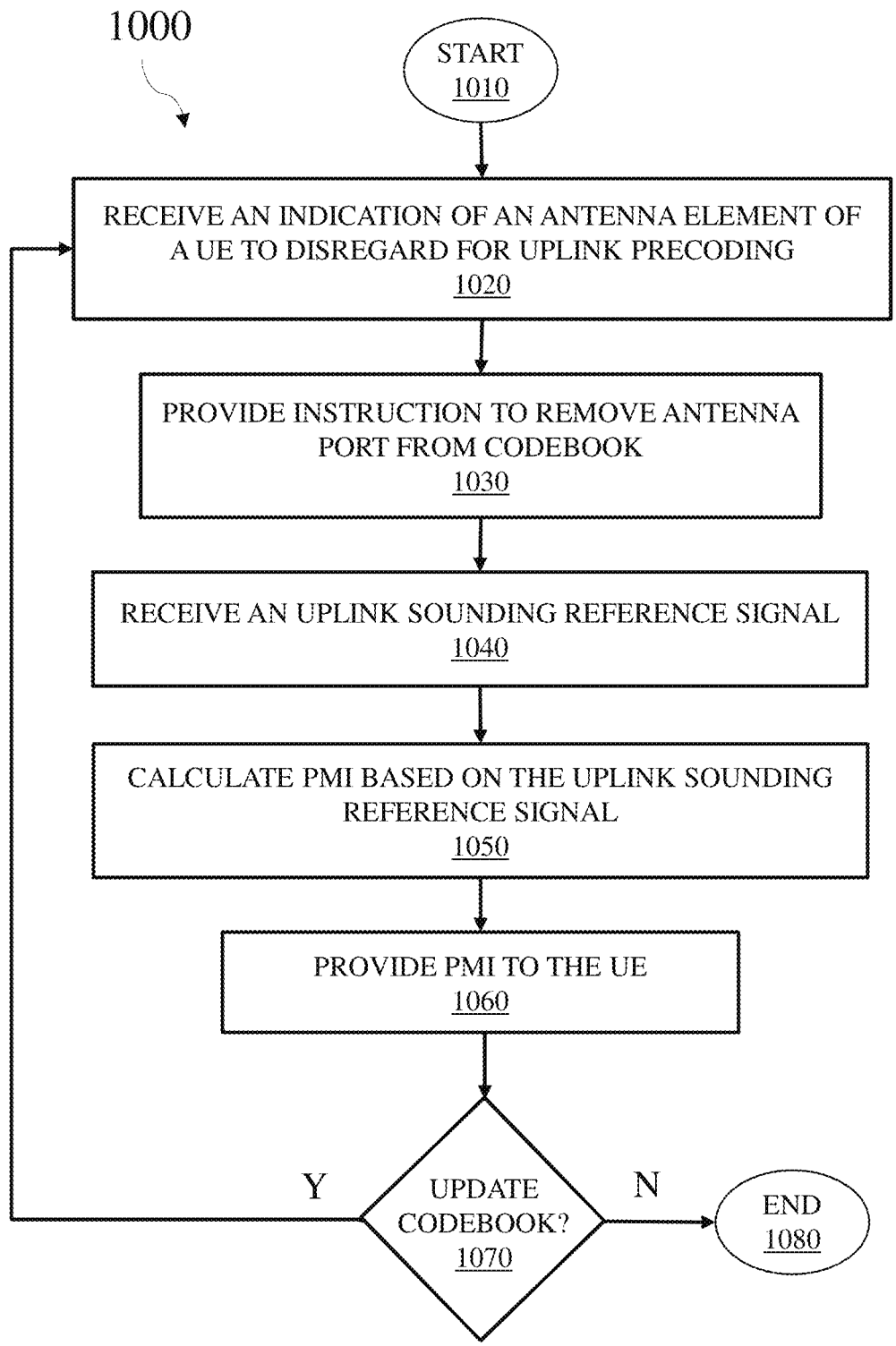

Turning now to FIG. 10, illustrated is a flow diagram of an embodiment of a method 1000 of operating a communication system (100). In addition to the method steps, the discussion of the method 1000 that follows will identify example elements (in parentheses) from preceding FIGUREs. The method 1000 begins at a start step or module 1010. At a step or module 1020, an apparatus such as a radio access node (e.g., a base station 120, 300 including processing circuitry 310) receives an indication of an antenna element (240) of a user equipment (110, 200) to disregard for uplink precoding. The antenna element (240) may provide, without limitation, interference for another node (110, 200) of the communication system (100), excess power consumption by the user equipment (110, 200), excess power consumption in relation to a battery charge level of the user equipment (110, 200), adverse radio-frequency exposure associated with a communication by the user equipment (110, 200), lower path gain compared to another antenna element (240) of the user equipment (110, 200), and/or insignificant contribution to received signal power at the apparatus (120, 300). For instance, the antenna element (240) may have a path gain 0.5 decibels lower than a path gain of another antenna element (240) at the user equipment (110, 200).

Figure 11:
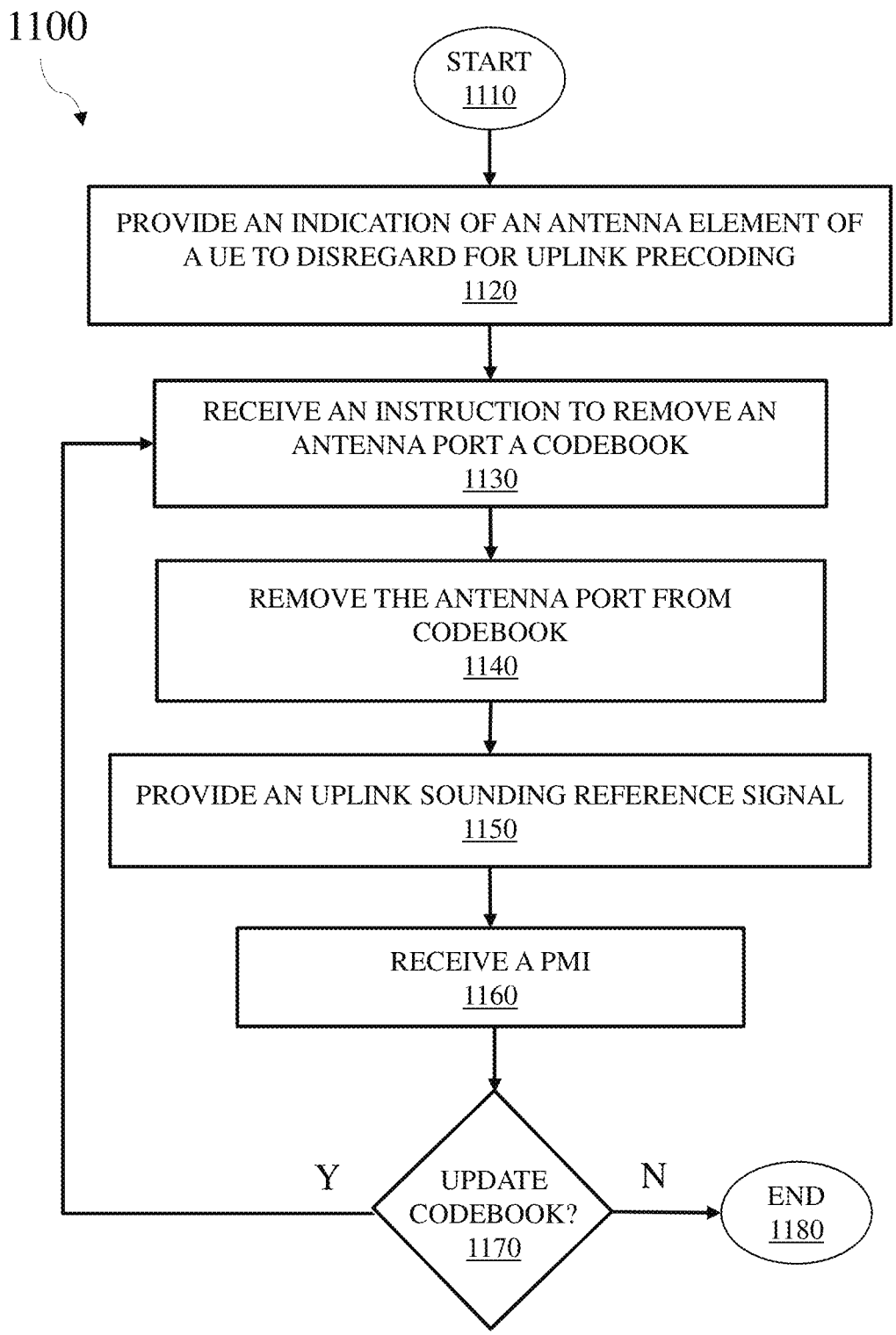

At a step or module 1030, the apparatus (120, 300) provides an instruction to direct the user equipment (110, 200) to remove an antenna port (250, e.g., temporarily setting the antenna port transmit power level to zero) associated with the antenna element (240) from a codebook employed by the user equipment (110, 200) to precode a communication within the communication system (100). The apparatus (120, 300) receives an uplink sounding reference signal from the user equipment (110, 200) at a step or module 1040. At a step or module 1050, the apparatus (120, 300) calculates a precoder matrix indicator ("PMI") based on the uplink sounding reference signal and also taking into account removal of the antenna port (250) associated with the antenna element (240), and provides the PMI to the user equipment (110, 200) at a step or module 1060. Of course, receipt of the uplink sounding reference signal and resulting PMI may occur as earlier steps in the method 1000 of operating the communication system (100). At a decisional step or module 1070, the apparatus (120, 300) determines if the codebook should be updated. If the codebook should be updated, the method 1000 returns to the step or module 1020 for further processing, otherwise the method 1000 ends at an end step or module 1080. Of course, if no other antenna port (250) should be removed from the codebook but other updates are necessary, then the method 1000 may omit selective steps or modules of the method 1000 of operating the communication system (100). Also, updating the codebook includes modifying the use of the codebook such as temporarily restricting the availability of an antenna port (250) thereof, but not necessarily permanently removing the specified antenna port (250) from the codebook. Turning now to FIG. 11, illustrated is a flow diagram of an embodiment of a method 1100 of operating a communication system (100). In addition to the method steps, the discussion of the method 1100 that follows will identify example elements (in parentheses) from preceding FIGUREs. The method 1100 begins at a start step or module 1110. At a step or module 1120, an apparatus such as a user equipment (110, 200) including processing circuitry (210) provides an indication of an antenna element (240) of the apparatus (110, 200) to disregard for uplink precoding. The antenna element (240) may provide, without limitation, interference for another node (110, 200) of the communication system (100), excess power consumption by the apparatus (110, 200), excess power consumption in relation to a battery charge level of the apparatus (110, 200), adverse radio-frequency exposure associated with a communication by the apparatus (110, 200), lower path gain compared to another antenna element (240) of the apparatus (110, 200), and/or insignificant contribution to received signal power at a radio access node (120, 300). For instance, the antenna element (240) may have a path gain 0.5 decibels lower than a path gain of another antenna element (240) at the apparatus (110, 200).

Figure 12:
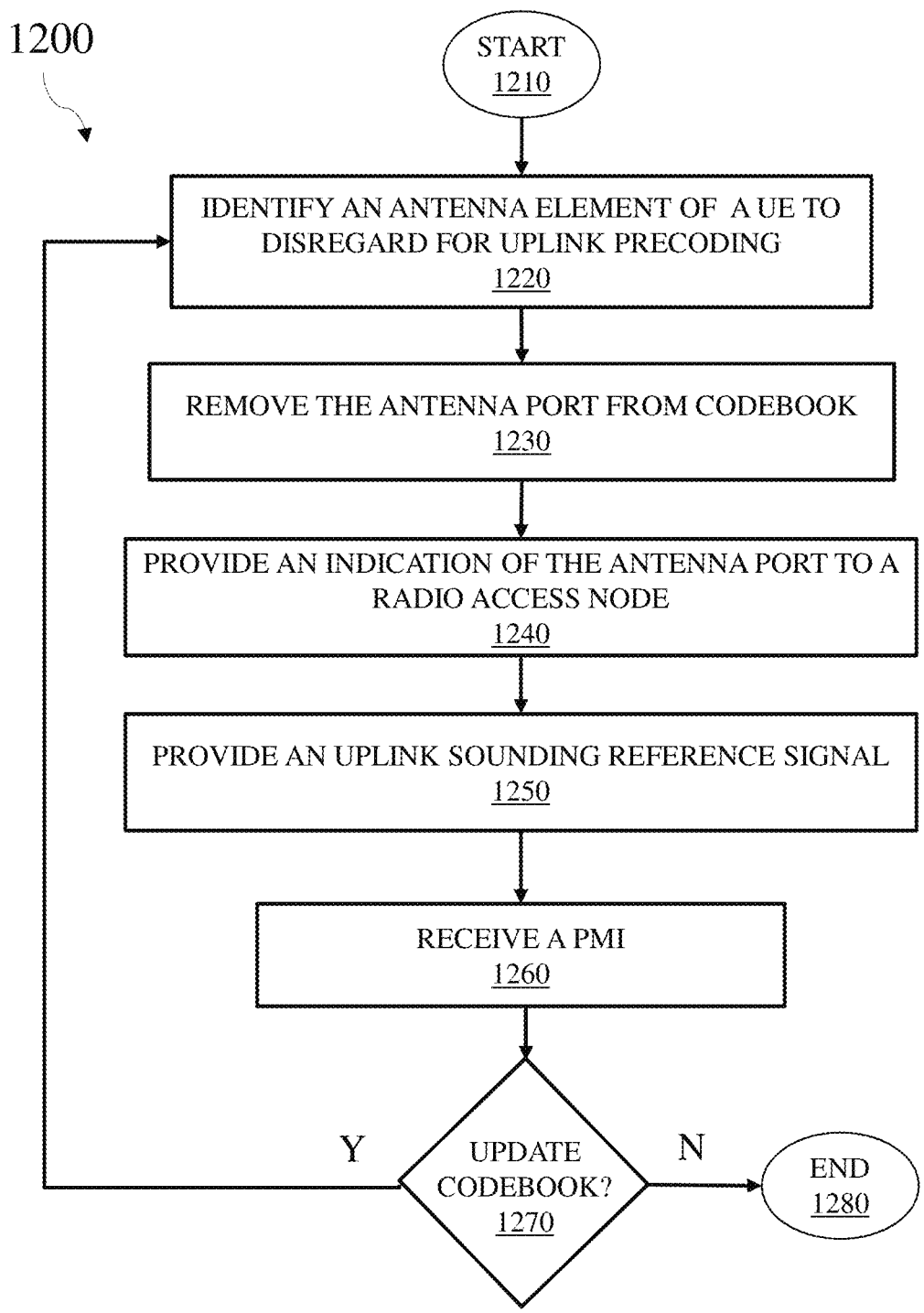

At a step or module 1130, the apparatus (110, 200) receives an instruction to remove an antenna port (250, e.g., temporarily setting the antenna port transmit power level to zero) associated with an antenna element (240) to disregard for uplink precoding. At a step or module 1140, the apparatus (110, 200) removes the antenna port (250) associated with the antenna element (240) from a codebook employed by the apparatus (110, 200) to precode a communication within the communication system (100). The apparatus (110, 200) provides an uplink sounding reference signal to a radio access node (120, 300) to calculate a precoder matrix indicator ("PMI") at a step or module 1150. At a step or module 1160, the apparatus (110, 200) receives the PMI from the radio access node (120, 300). Of course, providing the uplink sounding reference signal and resulting PMI may occur as earlier steps in the method 1100 of operating the communication system (100). At a decisional step or module 1170, the radio access node (120, 300, or another communication node in the communication system 100) determines if the codebook should be updated. If the codebook should be updated, the method 1100 returns to the step or module 1120 for further processing, otherwise the method 1100 ends at an end step or module 1180. Of course, if no other antenna port (250) should be removed from the codebook but other updates are necessary, then the method 1100 may omit selective steps or modules of the method 1100 of operating the communication system (100). Also, updating the codebook includes modifying the use of the codebook such as temporarily restricting the availability of an antenna port (250) thereof, but not necessarily permanently removing the specified antenna port (250) from the codebook. Turning now to FIG. 12, illustrated is a flow diagram of an embodiment of a method 1200 of operating a communication system (100). In addition to the method steps, the discussion of the method 1200 that follows will identify example elements (in parentheses) from preceding FIGUREs. The method 1200 begins at a start step or module 1210. At a step or module 1220, an apparatus such as a user equipment (110, 200) including processing circuitry (210) identifies an antenna element (240) of the apparatus (110, 200) to disregard for uplink precoding. The antenna element (240) may provide, without limitation, interference for another node (110, 200) of the communication system (100), excess power consumption by the apparatus (110, 200), excess power consumption in relation to a battery charge level of the apparatus (110, 200), adverse radio-frequency exposure associated with a communication by the apparatus (110, 200), lower path gain compared to another antenna element (240) of the apparatus (110, 200), and/or insignificant contribution to received signal power at a radio access node (120, 300). For instance, the antenna element (240) may have a path gain 0.5 decibels lower than a path gain of another antenna element (240) at the apparatus (110, 200).

At a step or module 1230, the apparatus (110, 200) removes the antenna port (250, e.g., temporarily setting the antenna port transmit power level to zero) associated with the antenna element (240) from a codebook employed by the apparatus (110, 200) to precode a communication within the communication system (100). At a step or module 1240, the apparatus (110, 200) provides an indication of the antenna port (250) associated with the antenna element (240) to be removed from the codebook to a radio access node (120, 300). The apparatus (110, 200) provides an uplink sounding reference signal to the radio access node (120, 300) to calculate a precoder matrix indicator ("PMI") at a step or module 1250. At a step or module 1260, the apparatus (110, 200) receives the PMI from the radio access node (120, 300). Of course, providing the uplink sounding reference signal and resulting PMI may occur as earlier steps in the method 1200 of operating the communication system (100). At a decisional step or module 1270, the radio access node (120, 300, or another communication node in the communication system 100) determines if the codebook should be updated. If the codebook should be updated, the method 1200 returns to the step or module 1220 for further processing, otherwise the method 1200 ends at an end step or module 1280. Of course, if no other antenna port (250) should be removed from the codebook but other updates are necessary, then the method 1200 may omit selective steps or modules of the method 1200 of operating the communication system (100). Also, updating the codebook includes modifying the use of the codebook such as temporarily restricting the availability of an antenna port (250) thereof, but not necessarily permanently removing the specified antenna port (250) from the codebook.

As described above, the exemplary embodiments provide both a method and corresponding apparatus consisting of various modules providing functionality for performing the steps of the method. The modules may be implemented as hardware (embodied in one or more chips including an integrated circuit such as an application specific integrated circuit), or may be implemented as software or firmware for execution by a processor. In particular, in the case of firmware or software, the exemplary embodiments can be provided as a computer program product including a computer readable storage medium embodying computer program code (i.e., software or firmware) thereon for execution by the computer processor. The computer readable storage medium may be non-transitory (e.g., magnetic disks; optical disks; read only memory; flash memory devices; phase-change memory) or transitory (e.g., electrical, optical, acoustical or other forms of propagated signals-such as carrier waves, infrared signals, digital signals, etc.). The coupling of a processor and other components is typically through one or more busses or bridges (also termed bus controllers). The storage device and signals carrying digital traffic respectively represent one or more non-transitory or transitory computer readable storage medium. Thus, the storage device of a given electronic device typically stores code and/or data for execution on the set of one or more processors of that electronic device such as a controller.

Although the embodiments and its advantages have been described in detail, it should be understood that various changes, substitutions, and alterations can be made herein without departing from the spirit and scope thereof as defined by the appended claims. For example, many of the features and functions discussed above can be implemented in software, hardware, or firmware, or a combination thereof. Also, many of the features, functions, and steps of operating the same may be reordered, omitted, added, etc., and still fall within the broad scope of the various embodiments.

Moreover, the scope of the various embodiments is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized as well. Accordingly, the appended claims are intended to include within their scope such processes, machines, manufacture, compositions of matter, means, methods, or steps.

What is claimed is:

1. A radio base station (RBS) operable to serve a user equipment (UE) in a wireless communication system, comprising:
processing circuitry configured to:
receive, from a UE, an indication that transmissions from an antenna element associated with said UE may interfere with a non-serving RBS;
identify, in said serving RBS, one or more antenna elements of said UE to disregard for uplink precoding, including said antenna element of said UE that may interfere with said non-serving RBS; and,
provide an instruction to direct said UE to remove one or more antenna ports associated with said one or more antenna elements from a codebook employed by said UE to precode a transmission to said serving RBS.

2. The RBS recited in claim 1, wherein said processing circuitry is configured to provide a precoder matrix indicator (PMI) in addition to said instruction.

3. The RBS recited in claim 2, wherein said processing circuitry is configured to calculate said PMI based on an uplink sounding reference signal received from said UE and taking into account removal of said one or more antenna ports associated with said one or more antenna elements.

4. A method of operating a radio base station (RBS) operable to serve a user equipment (UE) in a wireless communication system, comprising the steps of:
receiving, from a UE, an indication that transmissions from an antenna element associated with said UE may interfere with a non-serving RBS;
identifying, in said serving RBS, one or more antenna elements of said UE to disregard for uplink precoding, including said antenna element of said UE that may interfere with said non-serving RBS; and,
providing an instruction to direct said UE to remove one or more antenna ports associated with said one or more antenna elements from a codebook employed by said UE to precode a transmission to said serving RBS.

5. The method recited in claim 4, further comprising providing a precoder matrix indicator (PMI) in addition to said instruction.

6. The method recited in claim 5, further comprising calculating said PMI based on an uplink sounding reference signal received from said UE and taking into account removal of said one or more antenna ports associated with said one or more antenna elements.

7. A user equipment (UE) operable to communicate with a serving radio base station (RBS) in a wireless communication system, comprising:
processing circuitry configured to:
provide an indication to said serving RBS that transmissions from an antenna element associated with said UE may interfere with a non-serving RBS;
receive, from said serving RBS, an instruction to remove one or more antenna ports associated with one or more antenna elements of said UE to disregard for uplink precoding, including said antenna element of said UE that may interfere with said non-serving RBS; and,
remove said one or more antenna ports associated with said one or more antenna elements from a codebook employed by said UE to precode a transmission to said serving RBS.

8. The UE recited in claim 7, wherein said processing circuitry is configured to receive a precoder matrix indicator (PMI), from said serving RBS, in addition to said instruction.

9. The UE recited in claim 8, wherein said processing circuitry is configured to provide an uplink sounding reference signal for said serving RBS to calculate said PMI.

10. A method of operating a user equipment (UE) to communicate with a serving radio base station (RBS) in a wireless communication system, comprising the steps of:
providing an indication to said serving RBS that transmissions from an antenna element associated with said UE may interfere with a non-serving RBS;
receiving, from said serving RBS, an instruction to remove one or more antenna ports associated with one or more antenna elements of said UE to disregard for uplink precoding, including said antenna element of said UE that may interfere with said non-serving RBS; and,
removing said one or more antenna ports associated with said one or more antenna elements from a codebook employed by said UE to precode a transmission to said serving RBS.

11. The method recited in claim 10, further comprising receiving a precoder matrix indicator (PMI), from said serving RBS, in addition to said instruction.

12. The method recited in claim 11, further comprising providing an uplink sounding reference signal for said serving RBS to calculate said PMI.

* * * * *